Feb. 21, 1928. 1,659,917
J. J. LAWLER
THERMOSTATIC VALVE
Filed April 11, 1924 2 Sheets-Sheet 2

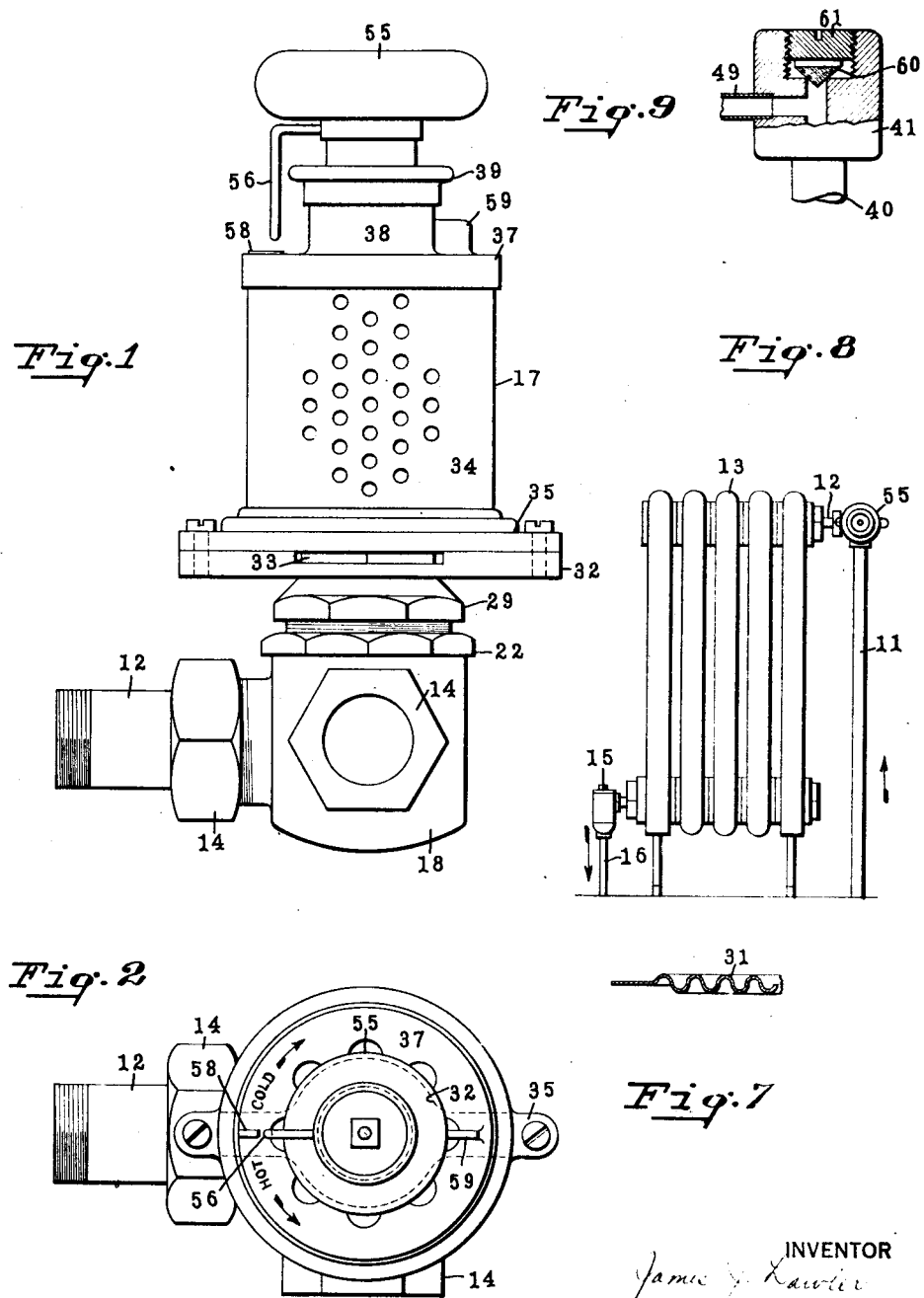

INVENTOR
James J. Lawler
BY
Duell, Warfield & Duell
ATTORNEY

Patented Feb. 21, 1928.

1,659,917

UNITED STATES PATENT OFFICE.

JAMES J. LAWLER, OF MOUNT VERNON, NEW YORK.

THERMOSTATIC VALVE.

Application filed April 11, 1924. Serial No. 705,738.

This invention relates to improvements in automatic thermal control means, and more especially to such a control means for automatically regulating the temperature within a compartment.

It is the general object of the invention to provide an improved thermo-sensitive control for automatically maintaining a desired constant temperature within a compartment and having a high degree of sensibility and positiveness of operation under all conditions of use.

A further object of the invention is to provide an improved thermal control device of the class mentioned, of increased structural simplicity resulting in increased convenience in installation, repair or adjustment, and being more quickly responsive to temperature changes than prior devices.

A more particular object of the invention is to provide an improved, particularly sensitive and positively acting thermo-sensitive element responsive to the temperature of the surrounding medium within a compartment for controlling the admission of heating fluid to a radiator, thus to maintain constant temperature within the compartment.

Another object is to provide an improved method of associating a thermo-responsive fluid with a thermostatic element so as to assure accurate functioning in use.

Other objects will be in part obvious and in part pointed out in connection with the following detailed description of an illustrative but preferred embodiment of the invention.

The invention accordingly comprises the features of construction, combinations of elements, and arrangement of parts, which will be exemplified in the construction hereinafter set forth and the scope of the application of which will be indicated in the claims.

For a more complete understanding of the nature and objects of the invention reference is had to the accompanying drawings showing preferred embodiments of the invention, and in which, Figure 1 is a side elevation of a combined valve and thermostatic control element embodying the invention;

Fig. 2 is a top plan view thereof;

Fig. 7 is a detailed sectional view of the flexible diaphragm which is disposed between the thermostat and valve;

Fig. 8 is an elevation illustrating one method of applying the invention to a steam or hot water radiator, and Fig. 9 is a sectional detail showing a modification of the thermostatic element.

Figure 4:
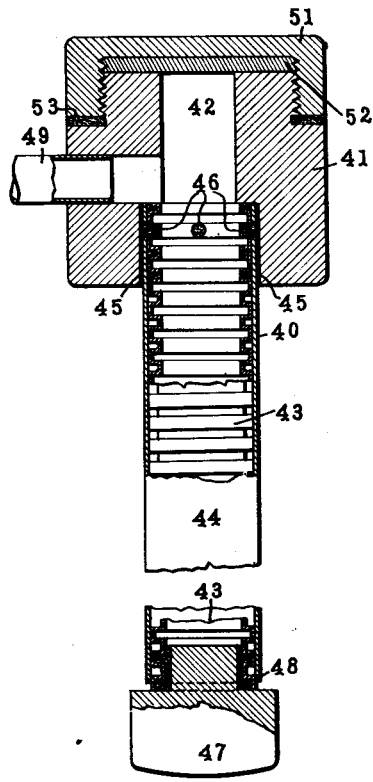
Fig. 4 is an enlarged detailed longitudinal sectional view of a part of the thermostatic element, parts being shown in elevation.

Referring to the drawing for a detailed description of the embodiment of the invention shown in Figs. 1 to 8, a control valve is indicated generally at 10 being connected in the service or supply pipe 11 which leads at 12 from the valve to a radiator 13. As shown, the valve may be of the globe angle type having unions 14 for connection to the supply pipe 11 and to pipe 12, or the connections may be varied to suit the particular installation. In the installation illustrated in Fig. 8 return is made from the radiator through a suitable trap 15 and pipe 16, but this assembly may be varied to conform to good practice, dependent upon whether steam or hot water is available and upon other factors. The thermostatic unit is indicated generally at 17, being mounted in juxtaposition to the valve, and preferably carried thereby in position for controlling operation of the valve.

The valve casing 18 has an interior cavity with conduits leading thereto and therefrom with a port 19 therebetween in a dividing wall providing an annular valve seat 20. Substantially coaxially with this valve seat, the casing is formed with a cylindrical port 21 to which is threaded a supporting member or bonnet 22 having an upwardly opening depression or cavity and an opening extending through the lower wall at the bottom of the cavity. A movable closure member 23 is disposed within the valve casing and preferably having a cushion plate 24 for contacting with the valve seat in making a tight closure of the port 19. The closure member is supported for sliding movement in the bonnet by means of a supporting stem 25 extending through the opening in the bottom of the bonnet and being preferably tubular, and integral with the closure plate 23. This stem lies in the bonnet cavity terminating near the upper part thereof and threaded to its extremity is a follower plate 26 having a peripheral flange 27 contacting with the inner wall surface of the bonnet. By means of the stem and flange, the closure plate is guided and supported for sliding movement to open and close the valve port. A spring 28 is stressed between the bottom of the bonnet and the follower plate 26 to bias the valve closure member toward open position. The bonnet is seated firmly on the valve casing so as to make a tight joint therewith.

A cover plate 29 overlies the bonnet 22 being preferably threaded thereto and provided with a threaded boss 30 for attachment of the thermostatic unit 17. A flexible diaphragm 31 overlies the follower plate 26, being marginally gripped between the upper edges of the bonnet and a seat provided in the supporting member 29, so as to provide a thoroughly tight seal at this point preventing escape of the temperature changing fluid conducted through the valve. The closure plate of the valve is controlled by spring 28 and by the thermostatic element operating through the flexible diaphragm 31 and the follower plate, as more fully pointed out below. This arrangement provides a packless valve which is thoroughly tight and wherein the frictional resistance to operation is negligible.

The thermostatic unit as stated, is mounted upon the cover plate or cap 29, being rigidly supported in position thereon by the supporting bar or plate 32 which is centrally apertured for the reception of the threaded boss 30 and secured in seated position thereon by a nut 33. The thermostatic unit may thus be positioned in any axially angular position desired relatively to the valve casing. The operative elements of the thermostat are supported in position on the bar 32 through the medium of a casing 34 secured in position by a flanged ring 35 screwed or otherwise suitably secured to the bar. The casing is preferably tubular, having perforated side, bottom and top walls to permit free circulation of the surrounding medium and the bottom wall preferably extends outwardly under the side wall, being marginally seated as at 36 in the under side of the flanged supporting ring 35 to support it in position. This supporting ring is preferably firmly united with the tubular walls of the casing, as by soldering, and the bottom of the casing may be removable to permit ready insertion or removal of the thermostatic elements. The cover plate 37 of the casing is provided with an upstanding tubular boss or neck 38 having an apertured cap 39 screwed thereon.

The thermo-sensitive element of the thermostat is mounted within the casing 34, including a centrally disposed column 40 having a rigid block or header 41 provided with an internal chamber 42. Communicating with this chamber is a longitudinally expansible and contractible tubular cell 43 rigidly united and hermetically sealed to the block, which for this purpose is provided with a bore opening into the lower side thereof and being somewhat larger in diameter than that of the chamber so as to provide an annular shoulder against which the end of the cell may be seated. This cell is provided with circumferential corrugations to render it longitudinally flexible so as to offer slight resistance to longitudinal expansion or contraction, while preserving relative transverse rigidity. The corrugations are preferably coextensive with the length of the cell. Surrounding this cell is a supporting and stiffening member or tube 44 disposed to contact with the exterior surface of the cell so as to prevent buckling or other lateral distortion thereof. This stiffening member is preferably rigidly secured to the block 41 and may, as shown, extend into the bore thereof. As it is important that a thoroughly rigid and tight joint be provided at this point, the cell, supporting tube and block may be integrally united as by soldering or brazing, as indicated at 45, so as to provide a hermetical seal. To increase the rigidity and security of this joint, the cell and supporting tube are provided with transverse aligning openings or pockets 46 into which the molten metal flows, providing integral lugs or rivets therebetween. The supporting tube is preferably coextensive at its lower end with the cell and is unsecured thereto except at its upper end, as described. A valve operating plunger 47 is connected to the lower end of the cell, having a stem extending thereinto and being integrally sealed as at 48 to provide a rigid hermetical union.

Figure 3:
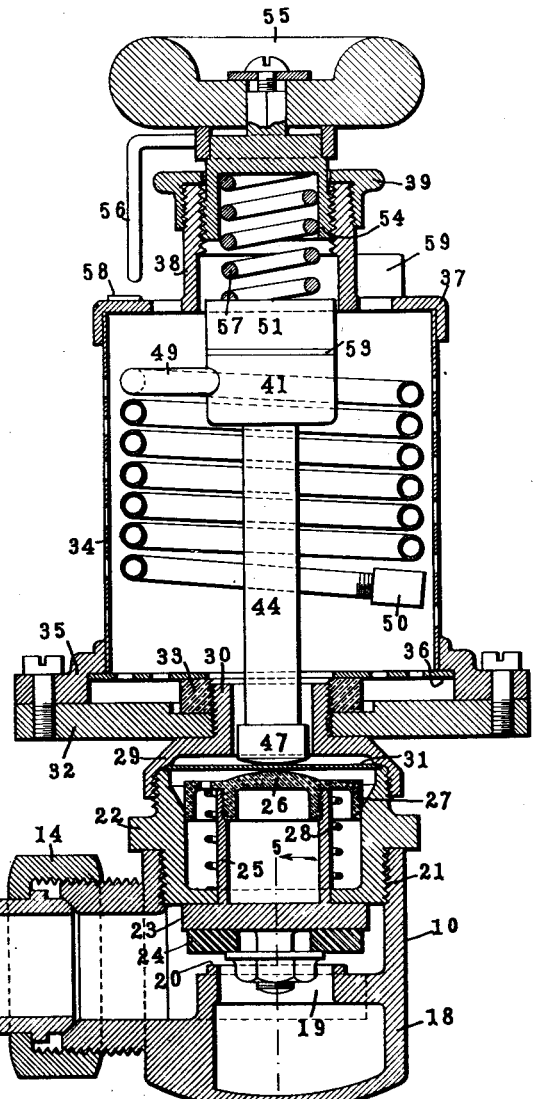
Fig. 3 is an enlarged longitudinal central section of the assembly of Fig. 1.
Figure 5:
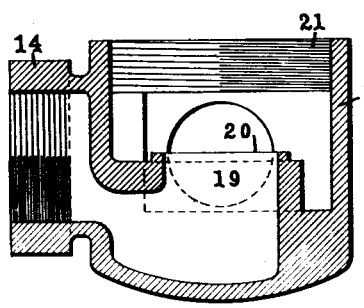
Fig. 5 is a central sectional view on the line 5—5 of Fig. 3 of the valve casing detached from the thermostatic element.
Figure 6:
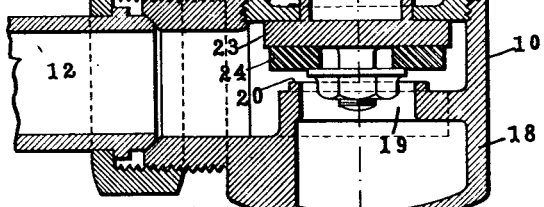
Fig. 6 is a plan view of Fig. 5.

As best shown in Figs. 3 and 4, the block or holder 41 is provided with a passageway extending laterally from the chamber 42 entirely through the wall of the block, in which a tube 49 is integrally sealed to make a thoroughly tight joint. This tube is entirely supported by the block and is coiled thereabout in successive convolutions to form a thermo-sensitive surface substantially tubular in form and surrounding the central column 40. The lower end of the coil is sealed as by means of a cap 50. The entire internal space of the column and coil tube 49 provides in effect one continuous chamber which is completely filled with a thermo-sensitive expansible and contractible fluid. Kerosene oil is found to serve well as a fluid for this purpose. In order that the thermo-sensitive element may act positively to operate the valve, all air or other gas and other extraneous matter should be thoroughly excluded.

The chamber 42 has an outlet extending to the upper side of the block 41 serving as a filling opening through which the thermosensitive fluid may be introduced. The filling opening is sealed after filling is completed by means of a sealing cap 51 and a sealing washer 52 of a compressible material such as soft lead. The cap is arranged to screw down tightly to force the sealing washer into sealing position against the upper face of the block. When tightly screwed down a space is left below the lower edge of the cap permitting the washer to be pressed down tightly, and into which drops of solder as indicated at 53 may be tacked to secure the cap rigidly in sealed position. The fluid receiving parts of the thermostatic element are preferably of metal of good heat conductivity and non-porous so as to prevent escape of the contained fluid. The central column 40 by itself provides a thermosensitive element which will be thermally influenced by the surrounding medium, but the sensitivity is substantially increased by means of the coiled tube 49 connected with the central column as described.

The completed thermo-sensitive element of the thermostat constituted by the column 40 and the tubular coil surrounding the same is mounted in floating position in the casing 34 which forms a supporting frame for this purpose. This floating support is accomplished by means of the aperture in the boss 30 of the cap 29 receiving the plunger 47, and the tubular neck 38 receiving the upper end of the block 41. This arrangement provides for longitudinal adjustment or other movement of the thermostatic element and permits the latter to be readily removed or replaced. An adjusting block 54 may be internally threaded to the neck 38 to which is attached an operating hand wheel 55 carrying a pointer or index 56. A pocket is preferably provided on the under side of the adjusting block for the reception of a relatively stiff relief spring 57 which is confined between the adjusting block and the upper end of the central column of the thermo-sensitive element. The cap plate 37 of the casing may be provided with an index mark 58 for cooperation with the pointer 56 to indicate a standard position or point of reference, and a lug 59 is preferably disposed on the opposite side of the neck for cooperation with the pointer to act as a limiting stop for turning movement of the hand wheel.

It is desirable for the most accurate and sensitive temperature control that the sensitive element of the thermostat be filled with its fluid at a temperature corresponding to that which the thermostatic unit assumes when actually connected to control admission of heating fluid to the radiator, and when the latter is receiving heating fluid to maintain the room temperature at a desired point. The thermosensitive element will then be subjected to the same temperature changing influences met with in actual operation. This filling temperature may for convenience be termed the "climatic" temperature of the thermostatically controlled valve and the process of determining it may be termed "acclimating" the valve. The climatic temperature of a valve and control thermostat under given conditions, and when connected to the radiator at a particular point thereon and bearing the particular relation thereto, may be determined as follows: The thermostatic control unit is connected to the radiator in its correct operating position relative thereto, the chamber of the sensitive element being filled with the thermo-sensitive fluid, but the cap 51 is removed. Heating fluid may then be admitted to the radiator to bring it up to the temperature required to maintain the room at the desired standard temperature, the excess fluid, as expansion goes on, overflowing from the chamber. When the maximum temperature is reached, the thermostatic element is removed without allowing any more of the fluid to escape, and is placed in a vessel of liquid such as water, the temperature of which is brought up to a point so the level of the thermo-sensitive fluid is again at the point it reached when in position on the radiator. The temperature of the water is then read by means of a thermometer, giving a figure from which the climatic temperature is obtained. Instead of taking the temperature read on the thermometer as the climatic temperature, a temperature a few degrees therebelow will be selected as the true climatic temperature, for the reason that it is desired that the thermostatic element shall be operative to effect closing movement of the valve a little before the standard temperature is reached. Each thermostatic valve is intended to be applied to radiators operating under conditions obtaining during the acclimating process, and will be filled at the climatic temperature obtained as above set forth. The sealing of the thermostatic chamber is then effected by placing the cap 51 in position as above described. It will be seen therefore that the climatic temperature may vary under varying conditions of application, but will be fixed for any given set of conditions. The thermoresponsive fluid and the thermostatic parts being heated when filling takes place, moisture, air and other gas and other extraneous matter will be driven off and sealing will be effected under conditions effectually excluding these undesirable elements. A thermostatic element filled and sealed under the conditions set forth may be said to be "acclimated".

The operation of the device will now be understood, being largely embodied in the foregoing description, and may be summarized as follows: The apparatus, having been acclimated as set forth and the parts assembled substantially as shown in Fig. 3, is connected in its proper climatic position (that is the position for which the thermostatic element has been acclimated) with reference to the radiator, which may be for example that shown in Fig. 8. When the pointer 56 is at the index mark 58, the adjusting abutment block 54 will occupy such a position with relation to relief spring 57 that the thermostatic column 40 will be confined therebetween and the follower plate 26 of the valve closure member. As the temperature of the surrounding air, and consequently of the thermo-sensitive element of the thermostat rising from a lower point, approaches the standard temperature which the apparatus is set to maintain, expansion of the column effects closing movement of the valve to reduce the supply of heating fluid to the radiator. The thermostatic element will become stabilized at a point in its expansion to maintain a valve opening to admit heating fluid to the radiator just sufficient to maintain the temperature constant at the desired standard degree. Adjustment for a higher or lower temperature may be made by turning the hand wheel 55 in one direction or another to adjust the distance between the adjusting block 54 and the follower plate 26.

If for any reason the temperature continues to rise after the valve closing member is firmly seated to close the valve, expansion of the fluid will continue; the relief spring under these conditions will be compressed and thus injury to the thermostat or other operative elements will be avoided.

In addition to adjustment of the thermo-sensitive element, the hand wheel 55 may also be employed to close or open the valve manually, acting for this purpose through the relief spring 57 and the rigid central column 40. For accomplishment of this purpose, the threads between the adjusting block 54 and the neck 38 may be coarse so sufficient longitudinal movement is effected by a relatively small angular movement of the hand wheel. The apparatus is preferably proportioned so complete closure of the valve is effected when the pointer 56 comes into contact with the stop 59. It will be observed that the relief spring 57 is relatively stiff as compared with the valve spring 28, so closure of the valve may be effected by very slight compression of the relief spring.

A slight modification of the thermostatic element is shown in Fig. 9, in which the rigid element 41 is provided with an internally threaded recess in its upper face communicating with the interior chamber. This recess provides a filling outlet for the thermostatic element and a sealing member 60 of soft metal or similar sealing material is adapted to be forced into sealing position by means of the threaded cap 61.

Although the thermostatic control device has been described with particular relation to heating apparatus, it will be understood by those skilled in the art that it may be applied equally as well to refrigeration.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. In an automatic temperature control device, the combination with a spring biased valve connected in a conduit for controlling the passage of a temperature changing fluid, of a thermostatic element mounted in a compartment where the temperature is to be controlled and including a rigid thermo-sensitive column with an internal cavity, a closed tubular member coiled about said column, and lying in elongated tubular form thereabout and communicating with the internal cavity thereof, a thermo-responsive, expansible and contractible fluid completely filling said tubular member and cavity, a tubular casing surrounding said thermostatic element and being perforated to permit free circulation of the surrounding medium whereby the element is readily responsive thereto, a valve operating plunger connected with said column for actuation by said thermo-responsive fluid to control said valve against the bias of its spring, means for mounting and guiding said column for bodily movement in said casing and a manual means for adjusting the column to vary the control of said valve by said thermostatic element.

2. In an automatic temperature control device, the combination with a spring biased valve connected in a conduit for controlling the passage of a temperature changing fluid, of a thermostatic element mounted in a compartment where the temperature is to be controlled and including a rigid thermo-sensitive column with an internal cavity, a closed tubular member coiled about said column and lying in elongated tubular form thereabout and communicating with the internal cavity thereof, a thermo-responsive, expansible and contractible fluid completely filling said tubular member and cavity, a tubular casing surrounding said thermostatic element and being perforated to permit free circulation of the surrounding medium whereby the element is readily responsive thereto, a valve operating plunger connected with said column for actuation by said thermo-responsive fluid to control said valve against the bias of its spring, means for mounting and guiding said column for bodily movement in said casing and a manual means for adjusting the column to vary the control of said valve by said thermostatic element and to effect independent opening and closing of the valve.

3. In an automatic temperature control device, the combination with a spring biased valve connected in a conduit for controlling the passage of a temperature changing fluid, of a thermostatic element mounted in a compartment where the temperature is to be controlled and including a rigid thermo-sensitive column with an internal cavity, a closed tubular member coiled about said column, and lying in elongated tubular form thereabout and communicating with the internal cavity thereof, a thermo-responsive, expansible and contractible fluid completely filling said tubular member and cavity, a tubular casing surrounding said thermostatic element and being perforated to permit free circulation of the surrounding medium whereby the element is readily responsive thereto, a valve operating plunger connected with said column for actuation by said thermo-responsive fluid to control said valve against the bias of its spring, means for mounting and guiding said column for bodily movement in said casing, a manual means for adjusting the column to vary the control of said valve by said thermostatic element, and a relief spring opposing the bias of said valve for receiving the longitudinal thrust of said column and permitting longitudinal movement thereof when the valve has reached its limit of travel.

4. In an automatic temperature control device, the combination with a spring biased valve connected in a conduit for controlling the passage of a temperature changing fluid, of a thermostatic element for controlling said valve, said thermostatic element including a rigid thermo-sensitive column with an internal cavity completely filled with a thermo-responsive, expansible and contractible fluid, means for mounting and guiding said column in floating position in said casing for bodily longitudinal movement therein, a valve actuating plunger controlled by said thermostatic element, and means for effecting bodily movement of said column to vary valve actuation by said thermostatic element.

5. In an automatic temperature control device, the combination with a spring biased valve connected in a conduit for controlling the passage of a temperature changing fluid, of a thermostatic element for controlling said valve, said thermostatic element including a rigid thermo-sensitive column with an internal cavity completely filled with a thermo-responsive, expansible and contractible fluid, a valve actuating plunger controlled by said thermostatic element, a casing surrounding said thermostatic element and being perforated to permit free circulation of the surrounding medium, means including a spring disposed adjacent each end of said thermo-sensitive column for mounting and guiding said column in floating position in said casing for bodily longitudinal movement therein and manual means for effecting bodily movement of said column to vary valve actuation by said thermostatic element.

6. In an automatic temperature control device, the combination with a spring biased valve connected in a conduit for controlling the passage of a temperature changing fluid, of a thermostatic element for controlling said valve and including a rigid column with an internal cavity completely filled with a thermo-responsive, expansible and contractible fluid, said column including a rigid member apertured to form a part of said cavity, a closed tubular thermo-sensitive coil completely filled with the thermo-responsive fluid and connected with said rigid member to communicate with the aperture thereof and to form a part of said cavity, and a longitudinally expansible and contractible tubular cell communicating at one end with the aperture of said rigid member.

7. In an automatic temperature control device, the combination with a spring biased valve connected in a conduit for controlling the passage of a temperature changing fluid, of a thermostatic element for controlling said valve and including a rigid column with an internal cavity completely filled with a thermo-responsive, expansible and contractible fluid, said column including a rigid member apertured to form a part of said cavity, a closed thermo-sensitive tubular member completely filled with the thermo-responsive fluid and connected with said rigid member to communicate with the aperture thereof and to form a part of said cavity, a longitudinally expansible and contractible tubular cell communicating at one end with the aperture of said member, a cell guiding and supporting member lying in position to cooperate with the exterior surface of said tubular cell to form a guide and support therefor against lateral flexure and a valve operating plunger united with and sealing the remote end of said cell and operatively connected to operate the valve.

8. In an automatic temperature control device, the combination with a spring biased valve connected in a conduit for controlling the passage of a temperature changing fluid, of a thermostatic element for controlling said valve and including a rigid column with an internal cavity completely filled with a thermo-responsive, expansible and contractible fluid, said column including a rigid member apertured to form a part of said cavity, a closed thermo-sensitive tubular member sealed into said rigid member so as to form a part of said cavity and completely filled with thermo-responsive fluid in communication with the fluid of said aperture, a longitudinally expansible and contractible cell sealed to said rigid member and communicating with the fluid aperture thereof, a valve operating plunger united to one end of said cell to effectually seal the same, and a tubular supporting casing for said cell carried by said rigid member.

9. In an automatic temperature control device, in combination, a longitudinally expansible and contractible tubular cell containing thermo-responsive fluid, a tubular thermo-sensitive coil containing thermo-responsive fluid, a chamber containing thermo-responsive fluid and having rigid walls to which said thermo-sensitive coil and said cell are attached so the fluids in said coil and cell are in communication with each other through the fluid of said chamber, said cell and said coil cooperating to provide a unitary thermostatic element removable from the control device and replaceable therein as a unit and supporting mechanism for suspending said thermo-static element in floating position for cooperation to control a fluid controlling valve.

10. In an automatic temperature control device, the combination with a valve connected in a conduit for controlling the passage of a temperature changing fluid, of a thermostatic element arranged to cooperate to control said valve for regulating flow of said fluid and being subjected to the influence of the medium whose temperature is to be controlled, said thermostatic element including a rigid member chambered for the reception of a thermo-responsive fluid, a frame for supporting said thermostatic element for bodily movement in position for cooperation to control said valve, a valve operating plunger connected at one end of said thermostatic element, a relief spring cooperating with said thermostatic element, manual means acting through said relief spring for effecting bodily adjustment of said thermostatic element to vary control thereby of said valve, and a tubular thermo-sensitive coil sealed to said rigid member and containing thermo-responsive fluid communicating with the fluid of said chamber.

11. A thermostatic element including a rigid member chambered for the reception of a thermo-responsive, expansible and contractible fluid and a longitudinally expansible and contractible tubular cell communicating with the chamber of said rigid member and rigidly united and hermetically sealed to said rigid member, a guiding and supporting member lying in position to cooperate with the exterior of said tubular cell and supported by said rigid member, and a tubular thermo-sensitive coil sealed to said rigid member and containing thermo-responsive fluid in communication with the fluid of said chamber.

12. A thermostatic element including, in combination, a longitudinally expansible and contractible tubular cell containing thermo-responsive, expansible and contractible fluid and a tubular thermo-sensitive coil containing thermo-responsive fluid in communication with said cell.

13. A thermostatic element including, in combination, a longitudinally expansible and contractible tubular cell containing thermo-responsive fluid, a tubular thermo-sensitive coil containing thermo-responsive fluid, and a chamber containing thermo-responsive fluid and having rigid walls to which said thermo-sensitive coil and said cell are attached so the fluids in said coil and cell are in communication with each other through the fluid of said chamber.

14. A thermostatic element including, in combination, a longitudinally expansible and contractible tubular cell containing thermo-responsive fluid, a tubular thermo-sensitive coil containing thermo-responsive fluid and being coiled in tubular form about said cell, a chamber containing thermo-responsive fluid and having rigid walls to which said thermo-sensitive coil and said cell are attached so that the thermo-sensitive fluids in said coil and cell are in communication with each other through the fluid of said chamber, and a supporting and guiding member for said cell carried by said rigid walls and contacting with the outer surface of said cell to guide and support the cell in its expansion and contraction.

15. A thermostatic element including a rigid member having a chamber containing a thermo-responsive fluid and having a filling outlet communicating with said chamber, a seal for tightly closing said filling outlet, a longitudinally expansible and contractible tubular cell communicating with the chamber of said rigid member and rigidly united and hermetically sealed to said rigid member, a guiding and supporting member positioned to cooperate with the exterior of said tubular cell and supported by said rigid member, and a thermo-sensitive tube containing thermo-responsive fluid in communication with the fluid of said chamber, said rigid member, said tubular cell and said thermo-sensitive tube constituting a unitary thermostatic element adapted for installation in operative position as a unit.

16. A thermostatic element including a rigid member having a chamber containing a thermo-responsive, expansible and contractible fluid and having a filling outlet communicating with the chamber, a seal for tightly closing said filling outlet, a longitudinally expansible and contractible tubular cell communicating with the chamber of said rigid member and rigidly united and hermetically sealed to said rigid member, a guiding and supporting member lying in position to cooperate with the exterior of said tubular cell and supported by said rigid member, a tubular thermo-sensitive coil sealed to said rigid member, and thermo-responsive fluid in said coil in communication with the fluid of said chamber.

17. A thermostatic element including a rigid member apertured for the reception of a thermo-responsive, expansible and contractible fluid, a longitudinally expansible and contractible tubular cell communicating with the aperture of said rigid member and rigidly united and hermetically sealed to said rigid member, and a guiding and supporting member lying in position to cooperate with the exterior of said tubular cell and supported by said rigid member, said guiding member and cell having opposed pockets and an integral metallic sealing union therebetween extending into said pockets.

18. In an automatic temperature control device, in combination, a valve having a casing with a port and valve seat and a closure member for said seat, a bonnet for said valve detachably mounted thereon in which said closure member is movably mounted, a supporting member detachably carried by said bonnet, and a thermostatic member carried by said supporting member for controlling operation of said closure member.

19. In an automatic temperature control device, in combination, a valve having a casing with a port and valve seat, a bonnet for said valve detachably mounted thereon, a closure member for said port slidably mounted in said bonnet, a supporting member detachably carried by said bonnet, a flexible sealing diaphragm supported on said bonnet and overlying said closure member, and a thermostatic member carried by said supporting member and having an operating member for controlling said closure member through said flexible diaphragm.

20. In a device of the character described, in combination, a valve casing having an annular seat therein and a tubular portion axially aligning with said seat, a supporting member detachably secured to said tubular portion and forming a tight joint therewith, a valve closure member, a stem slidable in said supporting member and supporting said closure member for movement toward and from said seat, a follower threaded to said stem, a spring tensioned between said supporting member and said follower, said closure member being thus wholly supported by said supporting member and forming therewith a unit attachable to or removable from said tubular portion as a unit, a sealing diaphragm secured to said supporting member, and operating means cooperating to operate said closure member through flexure of said diaphragm.

21. In a device of the character described, in combination, a valve casing having an annular seat therein and a tubular portion axially aligning with said seat, a supporting member or bonnet threaded to said tubular portion and having an opening at the outer side thereof, a valve closure member, a stem slidable in said supporting member and supporting said closure member for movement toward and from said seat, a follower threaded to said stem, a spring tensioned between said supporting member and said follower, a diaphragm positioned in the opening of said supporting member and operatively connected to said closure member, a cover plate overlying said diaphragm and having a central opening therein, and a movable operating member supported externally upon said supporting member and extending into said opening for operation of said valve closure member through and by flexure of said flexible diaphragm.

22. In a device of the character described, in combination, a valve casing having an annular seat therein and a tubular portion axially aligning with said seat, a supporting member or bonnet threaded to said tubular portion and having an opening at the outer side thereof, a valve closure member, a stem slidable in said supporting member and supporting said closure member for movement toward and from said seat, a follower threaded to said stem, a spring tensioned between said supporting member and said follower, a diaphragm in the opening of said supporting member and operatively connected to said closure member, a cover plate overlying said diaphragm and removably attached to said bonnet, and a thermostatic element carried by said cover plate and having an operating member cooperating through said diaphragm to control said valve closure member.

23. In an automatic temperature control device, the combination with a spring biased valve connected in a conduit for controlling the passage of a temperature changing fluid, of a thermostatic element for controlling said valve and including a rigid column with an internal cavity completely filled with a thermo-responsive, expansible and contractible fluid, said column including a rigid member apertured to form a part of said cavity, a closed thermo-sensitive tubular member completely filled with the thermoresponsive fluid and connected with said rigid member to communicate with the aperture thereof and to form an extension of said fluid cavity, a longitudinally expansible and contractible tubular cell communicating at one end with the aperture of said rigid member, and a thermostat support on the valve supporting said thermostatic element thereon in freely removable position and forming therewith a unitary control device, said thermostatic element being mounted on said thermostat support for cooperation directly with the valve for operation thereof.

In testimony whereof I affix my signature.

JAMES J. LAWLER.